United States Patent [19]

Pargamin et al.

[11] Patent Number: 4,471,024

[45] Date of Patent: Sep. 11, 1984

[54] METHOD OF MANUFACTURING A TEMPERED GLASS DIELECTRIC MATERIAL FOR USE AS AN ELECTRICAL INSULATOR AND INSULATOR FABRICATED THEREFROM

[75] Inventors: Laurent Pargamin, Vichy; Jean-Paul Parant, Arpajon; Henri Saïsse, Bondoufle; Michel Cornebois, Créteil, all of France

[73] Assignee: Ceraver, Paris, France

[21] Appl. No.: 436,919

[22] Filed: Oct. 27, 1982

[30] Foreign Application Priority Data

Oct. 29, 1981 [FR] France .................. 81 20297

[51] Int. Cl.³ .................. C03B 27/00; C03C 21/00
[52] U.S. Cl. .................. 428/410; 65/30.14; 174/137 B
[58] Field of Search .................. 65/30.14; 174/137 B, 174/138 C, 68 A; 428/410

[56] References Cited

U.S. PATENT DOCUMENTS

| | | | |
|---|---|---|---|
| 2,198,734 | 4/1940 | Littleton | 174/137 B |
| 3,287,200 | 11/1966 | Hess et al. | 65/30.14 X |
| 3,445,316 | 5/1969 | Megles | 65/30.14 X$n |
| 3,498,773 | 3/1970 | Grubb et al. | 65/30.14 |
| 3,607,172 | 9/1971 | Poole et al. | 65/30.14 |
| 3,751,238 | 8/1973 | Grego et al. | 65/30.14 |

FOREIGN PATENT DOCUMENTS 476401 12/1937 United Kingdom ............ 174/137 B

Primary Examiner—Kenneth M. Schor
Attorney, Agent, or Firm—Sughrue, Mion, Zinn, Macpeak & Seas

[57] ABSTRACT

A tempered glass dielectric material for use as an electrical insulator is thermally tempered to produce surface compression between 200 MPa and 400 MPa. At least part of the material is then chemically tempered under conditions of temperature and duration such that the surface compression due to the thermal tempering is reduced by between 50% and 80%. The chemical tempering is effected by applying to the relevant part of the material, at ambient temperature, a solution containing alkaline salts. This solution is dried and the material then heated for several hours at a temperature between 300° C. and 500° C. The solution has the following composition (in percentage by weight):

| | |
|---|---|
| $H_2O$ | 70% to 90% |
| Starch | 2% to 10% |
| $KNO_3$ | 4% to 12% |
| $K_2HPO_4$ + $KCl$ + $K_2SO_4$ | 4% to 20% |

2 Claims, 3 Drawing Figures

METHOD OF MANUFACTURING A TEMPERED GLASS DIELECTRIC MATERIAL FOR USE AS AN ELECTRICAL INSULATOR AND INSULATOR FABRICATED THEREFROM

BACKGROUND OF THE INVENTION

1. Field of the invention

The present invention concerns a method of manufacturing a tempered glass dielectric material for use as an electrical insulator and an insulator fabricated therefrom.

2. Description of the prior art

In the method normally used, glass dielectric materials are subject to thermal tempering such that they exhibit high surface compression and high central tension. This results in the dielectric material having a very much higher mechanical strength than annealed glass, and in particular high tensile strength. It is observed, however, that under certain circumstances, such as violent impact, for example, the existence of high internal stresses brings about virtually total disintegration of the dielectric material. This does not significantly or hazardously affect the residual mechanical strength of the insulator, but reduces its line of leakage to the distance in air between the electrodes.

The present invention is intended to provide an insulator manufactured from a dielectric material having improved impact resistance without prejudice to its tensile strength.

SUMMARY OF THE INVENTION

The present invention consists in a method of manufacturing a tempered glass dielectric material for use as an electrical insulator by first subjecting said dielectric material to thermal tempering such as to produce surface compression of between 200 MPa and 400 MPa and then subjecting at least part of said dielectric material to chemical tempering under such conditions of temperature and duration that said surface compression is reduced by between 50% and 80%.

The temperature is of the order of that at which the glass deforms and the chemical tempering treatment under these conditions produces a depth of diffusion by ion exchange of a few tens of microns.

It should be noted that the aforementioned method is applicable to an insulative glass dielectric material having a thickness of the order of 10 mm. It is not applicable to thin pieces of glass which could not withstand such severe thermal tempering stresses, or analogous chemical tempering conditions, in particular with regard to the treatment temperature. The depth of diffusion by ion exchange would then be wholly inadequate.

In a preferred embodiment of the invention, said chemical tempering is effected by applying to said dielectric material or said part thereof at ambient temperature a solution containing alkaline salts, then drying said dielectric material or said part thereof, and then heating said dielectric material or said part thereof for several hours at a temperature between 300° C. and 500° C.

Further chemical tempering methods which may be used will be further described later.

The invention further consists in an electrical insulator fabricated from a dielectric material manufactured using the method as disclosed hereinabove. This dielectric material is characterized by the fact that the parts having been subjected to the respective types of tempering feature:

very high surface compression, at least equal to that in an insulator having been subjected only to thermal tempering and still of significantly high magnitude to a depth which may exceed 1 mm, below the aforementioned depth, central tension substantially lower than that in an insulator having been subjected only to thermal tempering.

As a result, those parts of the insulator treated in accordance with the invention have improved impact resistance without prejudice to their tensile strength.

Other objects and advantages will appear from the following description of an example of the invention, when considered in connection with the accompanying drawing, and the novel features will be particularly pointed out in the appended claims.

DESCRIPTION OF THE PREFERRED EMBODIMENT

Of these samples A, B and C:

sample A was subjected to thermal tempering as per the prior art, sample B was subjected to chemical tempering, sample C was subjected to thermal tempering in the same manner as sample A followed by chemical tempering in the same manner as sample B.

Sample A was subjected to thermal tempering by means of a pressurized air blast. Curve A shows the distribution of tensile and compressive stresses in dielectric material A.

Sample B was subjected to chemical tempering under the following conditions: the annealed sample was placed at ambient temperature in a solution with the following composition:

| | |
|---|---|
| $H_2O$: | 77% |
| Starch: | 3% |
| $KNO_3$: | 8% |
| $K_2HPO_4$: | 12% |

This solution wetted the glass very thoroughly and the dielectric material was completely covered with a liquid film, the viscosity of which could be controlled. After drying, heat treatment was applied consisting of heating for eight hours at a temperature of 450° C.

Figure 1:
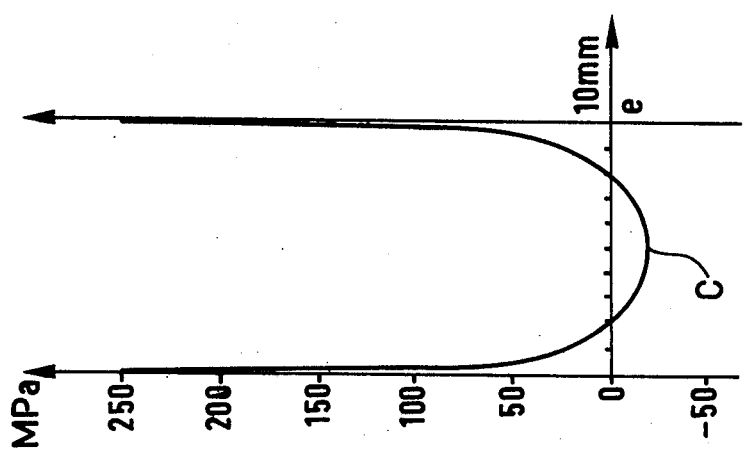
FIGS. 1, 2 and 3 are curves showing the distribution of stress in MegaPascals (MPa) in three samples A, B, and C of a soda-lime glass with an average thickness e of 10 mm.
Figure 2:
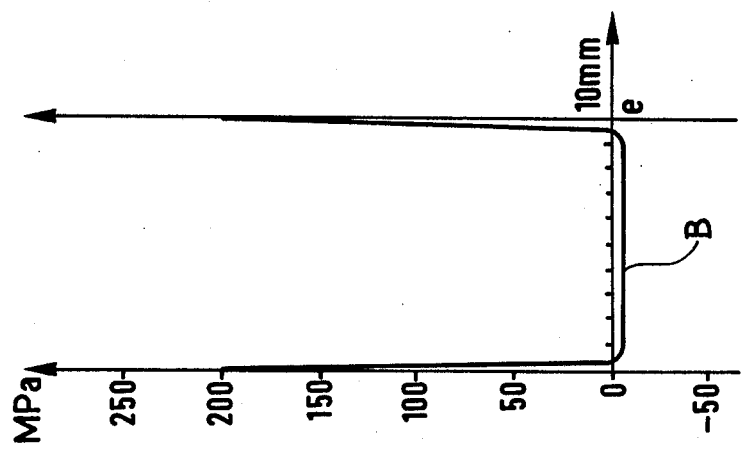
Figure 3:
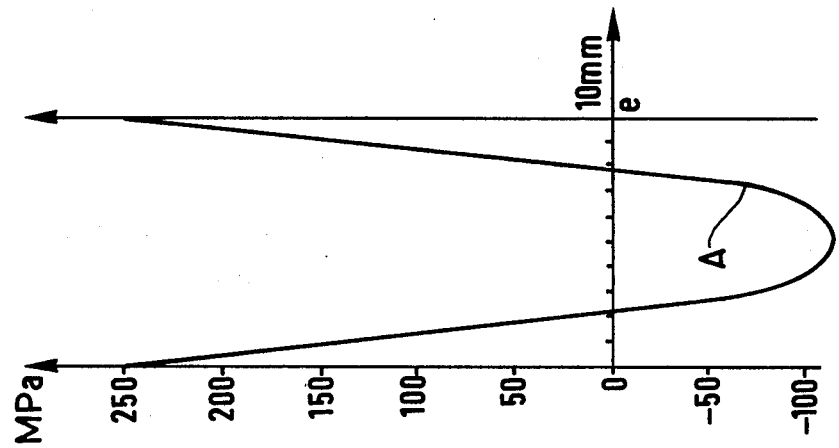

Curve B in FIG. 2 shows the distribution of tensile and compressive stresses in dielectric material B.

Sample C was subjected to thermal treatment similar to that to which sample A was subjected, followed by chemical treatment similar to that to which sample B was subjected. As shown in curve C, the stress distribution is particularly beneficial and differs substantially from the algebraic sum of stress distributions A and B. This gives sample C the required mechanical properties: the central tension is relatively low, avoiding disintegration in response to violent impact, whereas the surface compression is relatively high and extends to a relatively great depth, so that the glass has good tensile strength.

It will be realised that the thermal and chemical tempering conditions are not limited to those of the example described.

The thermal tempering conditions may be varied as appropriate to the composition of the glass and the temperature and relative humidity of the air blast.

The chemical tempering solution may be made up as follows (percentages by weight):

| | |
|---|---|
| $H_2O$ | 70% to 90% |
| Starch | 2% to 10% |
| $KNO_3$ | 4% to 12% |
| $K_2HPO_4$ + KCl + $K_2SO_4$ | 4% to 20% |

The starch may be replaced with any equivalent emulsifiable binder.

The duration of heating may be several hours, and the temperature may be between 300° C. and 500° C.

Such modification of the operating conditions produces three types of dielectric material A', B' and C', the mechanical characteristics of which are summarized in table I.

Note that the chemical tempering method used within the context of the invention is an industrial process having the following advantages:

it uses small quantities of alkaline salts and organic binder since the starting product is a solution, the very high adhesion of the film after drying facilitates handling of the treated parts, the depths of ionic diffusion into the glass are comparable with those obtained using other known chemical tempering methods, such as, for example:

spraying a mixture of salts in powder form and increasing the temperature sufficiently to melt part of the powder, spraying a hot solution saturated with reagent onto the cold dielectric material.

Whatever the way in which the method in accordance with the invention is applied, the dielectric material C' obtained has mechanical characteristics comparable with those of dielectric material C.

It will be understood that various changes in the details, materials and arrangements of parts, which have been herein described and illustrated in order to explain the nature of the invention, may be made by those skilled in the art within the principle and scope of the invention as expressed in the appended claims.

For example, the ionic exchange occurring during chemical tempering may be intensified by subjecting the parts so treated to an electric field during the treatment.

Also, and as has been previously mentioned, the entire insulator may be treated in accordance with the invention or, as an alternative, only those parts likely to be subject to violent impact are subjected to the double tempering process.

TABLE I

| | Maximum central tension | Maximum surface compression | Thickness of layer in compression |
|---|---|---|---|
| Thermally tempered dielectric material A' | >100 MPa | 200–400 MPa | >1 mm |
| Chemically tempered dielectric material B' | <10 MPa | 100–300 MPa | 20–100 μm |
| Thermally and then chemically tempered dielectric material C' | 10–50 MPa | 200–500 MPa | >1 mm |

It is claimed:

1. An electrical insulator made from a dielectric material manufactured by a process comprising the steps of first thermal tempering said dielectric material to produce surface compression of between 200 MPa and 400 MPa and then chemical tempering by replacing small ions of alkali metals situated in the glass with larger ions of alkali metals situated in the tempering solution at least part of said dielectric material under such conditions of temperature and duration that said surface compression due to said thermal tempering is reduced by between 50% and 80% whereby said insulator has a maximum surface compression between 200 MPa and 500 MPa with the surface compression layer extending to a depth of more than 1 mm and a maximum central tension between 10 MPa and 50 MPa, to insure that said insulator avoids disintegration in response to impact.

2. An electrical insulator fabricated from a dielectric material manufactured using the method as claimed in claim 6, wherein said step of chemical tempering comprises exchanging sodium for potassium by applying to at least part of said dielectric material at ambient temperature a solution containing potassium salts, drying said at least part of said dielectric material and then heating said at least part of said dielectric material for several hours at a temperature between 300° C. and 500° C.

* * * * *